United States Patent [19]

Johnston

[11] Patent Number: 4,519,542
[45] Date of Patent: May 28, 1985

[54] BOOMLESS, SPRAYER FOR FIELD APPLICATION FOR AGRICULTURAL LIQUIDS

[75] Inventor: Douglas Johnston, Decatur, Ala.

[73] Assignee: John Blue Company, a Division of Burnley Corporation, New York, N.Y.

[21] Appl. No.: 594,404

[22] Filed: Mar. 27, 1984

Related U.S. Application Data

[63] Continuation of Ser. No. 286,704, Jul. 24, 1981, abandoned.

[51] Int. Cl.³ ............................ B05B 9/06; B05B 17/04
[52] U.S. Cl. .......................................... 239/1; 239/155
[58] Field of Search ................... 239/1, 155, 156, 157, 239/160, 164, 161, 166–168, 170, 172, 176, 158, 570

[56]  References Cited

U.S. PATENT DOCUMENTS

| 2,221,433 | 11/1940 | Pitner | 239/168 |
|---|---|---|---|
| 2,597,727 | 5/1952 | Hanson | 239/164 |
| 2,690,355 | 9/1954 | Waters et al. | 239/168 |
| 3,034,727 | 5/1962 | Paulson | 239/169 |
| 3,143,295 | 8/1964 | Booker | 239/176 |
| 3,584,788 | 6/1971 | Lloyd | 239/172 |
| 3,747,858 | 7/1973 | Krynicki | 239/570 |
| 4,010,900 | 3/1977 | Flix et al. | 239/168 |
| 4,039,147 | 8/1977 | Hugg | 239/167 |
| 4,186,878 | 2/1980 | Lestradet | 239/160 |

FOREIGN PATENT DOCUMENTS

2480626  10/1981  France .............................. 239/166

Primary Examiner—Jeffrey V. Nase
Assistant Examiner—Michael J. Forman
Attorney, Agent, or Firm—Cushman, Darby & Cushman

[57]  ABSTRACT

A spray type applicator for liquid agricultural chemicals has no boom but uses only a cluster of nozzles which emit sprays to create narrow ground-impacting overlapping patterns extending laterally of the carrying vehicle. Swath width of the overall pattern is maintained substantially constant by automatically adjusting the above-ground height of those nozzles which throw laterally outwardly of the vehicle in accordance with nozzle pressure which is varied to vary application rate. Others of the nozzles, which direct their sprays downwardly, are fixed to the vehicle because the swath width of their ground-impacting spray patterns will not change appreciably with changes in nozzle pressure.

27 Claims, 27 Drawing Figures

BOOMLESS, SPRAYER FOR FIELD APPLICATION FOR AGRICULTURAL LIQUIDS

This is a continuation of application Ser. No. 286,704, filed July 24, 1981, now abandoned.

FIELD OF THE INVENTION

This invention relates to the application of liquid agricultural chemicals, e.g. fertilizers, fumigants, herbicides, insecticides, etc., to the surface of the soil from a moving vehicle. More especially, it relates to an extremely practical and economical simple method and apparatus for more uniformly applying and accurately metering such application at a substantially constant preselected rate in terms of amount per unit area, e.g. gallons per acre, at varying vehicle speeds and substantially irrespective of such speed. More particularly, this invention relates to a spray type applicator which will maintain a substantially constant swath width at various application rates without a boom.

BACKGROUND OF THE INVENTION

Most spray type applicators involve the use of a wide boom, carrying spaced spray nozzles, mounted on the rear of a vehicle, e.g. a two-wheel cart, a tandem wheel cart, or a truck, which also carries a tank for the liquid. A boom consists of a metal frame with a hose or pipe running along the frame with outlets for nozzles at regular intervals. The boom sections or wings extending beyond the opposite sides of the vehicle must fold up for transport on roads, and should have safe latches to prevent their coming loose on a road as they might smash against another vehicle. Booms usually are equipped with chain supports mounted on springs and shock absorbers to prevent excessive bounce and damage on rough ground. They must be extremely durable as they frequently hit trees, poles, and hummocks of earth. Even the best booms frequently are badly damaged in normal use, requiring extensive and expensive repair and time lost during a period when application time is critical.

Large farm corporations and chemical distributors, who apply liquid fertilizers for a fee, constantly exert pressure on manufacturers to build wider and wider booms capable of operating at higher and higher speeds, and to equip these booms with sophisticated anti-bounce and shock absorber systems, and with cab controlled means, usually hydraulic, for folding, leveling and adjusting height. Consequently a wide truck boom today may look like a bridge truss, and weigh almost as much. The electric controls, with signal lights, for the hydraulic cylinder valves remind one of the instrument panel of an airplane. Considerable training is necessary to prepare a driver for operating such a system.

A large truss-type boom typically may have outer hinged wing sections about 22 feet long which weigh about 250 pounds. The entire boom assembly typically may weigh about 850 pounds. The cost of such a boom and controls therefor is more than half the cost of the entire system, less the cost of the truck and the supply tank. In contrast, it is estimated that the total list price of a comparable boomless sprayer mechanism embodying this invention will be from 10 to 15 percent of the cost of a 50 foot boom and controls therefor, with shipping weights in about the same proportion.

Truck carried boom sprayer applicators, as disclosed in U.S. Pat. No. 4,267,971, granted May 19, 1981, almost always use so-called "Floodjet" spray nozzles of different size, i.e. K20 through K180, made by Spraying Systems Co. of Bellwood, Ill. With a boom sprayer, however, equipped with such nozzles, the ground-impact pattern of the spray from each nozzle varies in swath width with the pressure of the liquid supplied to the nozzle. Such pressure is varied to vary output rate. At high pressures, the patterns of adjacent nozzles overlap excessively, while at low pressures there may be no overlap at all.

Thus, for example, with a boom sprayer equipped with K50 nozzles spaced on 5 foot centers, if the pressure is such that the swath width of the pattern of each nozzle is 7.5 feet, every other 2.5 feet wide swath of the overall pattern has double the amount of liquid applied thereto as the swaths inbetween. Further, if a boom sprayer makes a pass through a field at high speed and nozzle pressure, producing an overall wide pattern, and the adjacent pass is at low speed and nozzle pressure producing a narrower overall pattern, the application rate will be very uneven near the adjacent edges of the passes. Additionally, the sprays from adjacent boom-mounted nozzles frequently collide or run together which causes a heavy concentration of the spray falling to the ground when the two sprays collide.

Attempts have been made to overcome some of the foregoing problems attendant boom sprayers by developing boomless sprayer type applicators, and some have even made and marketed. One type, presently on the market, is in the form of a cluster of nozzles arranged radially about a common manifold to throw a fan-shaped spray laterally outwardly on both sides of the vehicle, and also downwardly. The plane of the spray is generally vertical so that the spray will impact the ground in a pattern generally in the shape of a narrow band moving transversely of its length, which length is the swath-width of the pattern or application. This type of nozzle arrangement has not proven to be practical, however, because:

1. The swath width is not constant, as is necessary, varying over 100 percent from low output rates to high output rates which are determined by the pressure of the liquid supplied to the cluster.
2. Part of the spray is directed upwardly away from the ground so that it is easily deflected by wind, causing the ground-impact pattern to be distorted.
3. No means is provided for marking the swath, as with a ground dye spot, in order to provide the operator with means for locating the correct truck path for an even field coverage.

BRIEF SUMMARY OF THE INVENTION

Accordingly, it is an object of this invention to provide an improved boomless sprayer type applicator for agricultural liquids which will maintain a substantially constant swath width.

It is another object of this invention to provide such an applicator which will create and maintain a good ground-impact pattern of the spray emitted by the applicator, i.e. a relatively narrow band moving transversely of its length.

It is another object of this invention to provide such an applicator which has a plurality of closely-assembled spray nozzles wherein the output rate of all the nozzles, e.g. gallons per minute flow, at a given pressure maintains a substantially constant ratio to the swath width of the ground-impact pattern of the spray emitted from such nozzles 
It is another object of this invention to provide such an applicator that will create a concentrated high velocity spray directed downwardly from the horizontal to impact the ground hard and minimize wind distortion of the spray.

It is a further object of this invention to provide such an applicator that will produce a more uniform application across the entire width of the swath.

These objects are accomplished by an applicator which uses one or more nozzles that direct a spray laterally outwardly of the carrying vehicle. Each nozzle is constructed so that the swath width of the ground-impact pattern of the spray and the distance of the pattern from the vehicle vary in accordance with the above-ground height of the nozzle and the pressure of the liquid supplied thereto, preferably by a centrifugal pump driven in accordance with vehicle speed. Means are provided for automatically adjusting the above-ground height of each nozzle in accordance with such pressure in order to maintain substantially constant the swath width of the ground-impact pattern of the spray from the nozzle. The automatic means is provided with an adjustment to compensate for agricultural liquids of different specific gravities. Other nozzles are provided to complete the pattern laterally inwardly of that provided by the outwardly spraying nozzles. The pattern of these other nozzles is unaffected by pressure so their above-ground height is fixed.

Other objects and advantages of the invention will become apparent from the following detailed description and accompanying drawings, in which:

BRIEF DESCRIPTION OF THE DRAWINGS

FIGS. 1*a*–1*c* are rear schematic views of a sprayer applicator embodying the invention illustrating the throws and lateral extents of the ground-impact patterns of the sprays from the several nozzles at the indicated nozzle pressures and heights.

FIG. 2 is a plan view, corresponding to FIGS. 1*a*–1*c* of the right hand half of the swath and including an output chart FIGS. 3*a*–3*c* are diagrams of the position angles of the nozzles indicated in FIG. 2.

FIG. 4 is a fragmentary side elevational view of an embodiment of a vehicle-carried sprayer applicator embodying this invention FIG. 5 is a plan view of the sprayer applicator shown in FIG. 4.

FIG. 6 is an enlarged fragmentary view of the vertically-movable nozzle manifold shown in FIG. 4.

FIG. 7 is a rear view of the nozzle manifold shown in FIG. 6, partly in vertical section taken on line 7—7 of FIG. 6.

FIG. 8 in an enlarged fragmentary view of the cam and cam follower shown in FIG. 4.

FIG. 9 is a vertical sectional view taken on line 9—9 of FIG. 8.

FIG. 10 is an enlarged side view, partly in vertical section, of the operating cylinder and pressure-sensitive control cylinder shown in FIG. 4.

FIG. 11 is a sectional view taken on line 11—11 of FIG. 10.

FIG. 12 is a sectional view taken on line 12—12 of FIG. 10.

FIG. 13 is an end view taken on line 13—13 of FIG. 10.

FIG. 14 is a sectional view taken on line 14—14 of FIG. 10.

FIG. 15 is a sectional view taken on line 15—15 of FIG. 10.

FIG. 16 is an enlarged rear view of the right hand fixed nozzle manifold shown in FIGS. 4 and 5.

FIG. 17 is a vertical sectional view of the manifold shown in FIG. 16.

FIG. 18 is a sectional view taken on line 18—18 of FIG. 17.

FIG. 19 is an enlarged side view, partly in vertical section, of a modification of the control cylinder shown in FIG. 10.

FIG. 20 is a fragmentary plan view of the right hand portion of the cylinder shown in FIG. 19.

FIG. 21 is an end view taken on line 21—21 of FIG. 19.

FIG. 22 is a sectional view taken in line 22—22 of FIG. 19.

FIG. 23 is an enlarged view of the scale plate shown in FIG. 19.

DETAILED DESCRIPTION OF THE INVENTION

This invention is based on the discovery that the upper and lower edge portions of a spray emitted from a nozzle spraying generally horizontally can be made to strike the ground at approximately constant distance from the nozzle by adjusting the angle between the nozzle and the horizontal and by controlling above-ground height of the nozzle in accordance with the pressure of the liquid being supplied thereto, i.e. nozzle pressure.

Many sizes and types of nozzles are available commeroially for emitting sprays. Most nozzle manufacturers publish charts or possess data showing the minimum and maximum throw distances of such nozzles, i.e. the dimensions of their ground-impact spray patterns, including distances from the nozzle, when the nozzles are spraying water at 70° F. horizontally, and, if the spray is fan-shaped or flat, with the plane of the spray vertical. Such data are given for all the nozzle types and sizes, for many nozzle pressures and for many above-ground nozzle heights. Similar data is available for ground-impact spray patterns for nozzles intended to spray straight down. Spraying Systems Co. of Bellwood, Ill., is a nozzle manufacturer that possesses such data and makes it available to customers.

From the foregoing, it will be seen that the commercially available nozzles can be selected, assembled, and mounted on a vehicle to create narrow ground-impact spray patterns that move transversely of their length with the ends of adjacent patterns overlapping somewhat to create a continuous pattern that is desirable for application of agricultural liquids. The size of the nozzles also can be selected to produce a desired or predetermined output for a given nozzle pressure. If the pressure is changed, however, to change output rate, swath-width of the continuous pattern will change, a most undesirable situation. To save application time, it is most desirable to maintain swath width as wide as possible irrespective of output rate.

As mentioned above, it has been found that by a judicious selection of spray nozzles on the market and appropriate calculations using data available on their spray characteristics, such nozzles can be assembled and mounted to produce, at a given nozzle pressure, sprays thrown laterally outwardly of the direction of vehicle movement that produce ground-impact patterns extending transversely of the direction of vehicle movement which overlap slightly swath-wise or laterally, and the overall-swath width of which can be maintained substantially constant by adjusting the above-ground height of some of the nozzles in accordance with nozzle pressures, which is the same for all nozzles. More specifically, the midportion of the overall pattern is formed by nozzles that are directed substantially straight down and the swath width of such portion is substantially unaffected by changes in nozzle pressures within a given range of pressures. The swath width of the patterns formed by those nozzles which throw laterally outwardly of the vehicle, and the distance of those patterns from the vehicle, vary with variations in nozzle pressure. It is those nozzles for which above-ground height is adjusted to maintain substantially constant the swath width of the overall pattern on variations in nozzle pressure.

In a specific example, calculated from available data for spraying water at 70° F., to provide an output rate of from 19 to 30 gallons per acre on a 60 foot swath at 10 miles per hour, six fan spray nozzles manufactured by Spraying Systems Co. of Bellwood, Ill., should be mounted in a generally radial cluster. Two outer or outside nozzles should be directed in laterally opposite directions and inclined downwardly at about 5° from the horizontal. These two nozzles will throw farthest from the vehicle and form the outermost portions of the overall ground-impact pattern. Two nozzles should be directed in laterally opposite directions and inclined downwardly at an angle of about 23° from the horizontal. These two nozzles produce intermediate portions of the overall pattern nearer the vehicle, i.e., inwardly of the outermost portions. Finally, two nozzles should be directed downwardly at opposite angles of about 67° from the horizontal. These two nozzles produce the central portion of the overall pattern between the patterns produced by the intermediate nozzles.

The outermost nozzles are selected to be of the solid stream type No. 0050, the intermediate of the fan or flat spray type No. 2550 with a spray angle of 25°, and the central also of the flat spray type No. 8030 with a spray angle of 80°. These nozzles were selected on the basis of the data thereon provided by the manufacturer including output rate at various pressures and minimum and maximum throws when spraying water at 70° F. horizontally, with a vertical spray plane for the flat spray nozzles, at various nozzle pressures and above-ground nozzle heights. The outer or outside No. 0050 and intermediate No. 2550 nozzles each have a flow rate of 4.33 gallons per minute at 30 psi. The center No. 8030 nozzles each have a flow rate of 2.6 gallons per minute at 30 psi. The total output rate for all six nozzles making up the sprayer is from 19 to 30 gallons per acre at 10 mph for pressures of from 30 to 80 psi.

The overall and individual ground-impact patterns of the sprays of the several nozzles making up the sprayer, at selected nozzle pressures, are illustrated in FIGS. 1*a*–1*c* and 2. It was found, from calculations based on the manufacturer's data, that the dimensions and locations of the patterns of the center nozzles would vary little with changes in nozzle pressure. Hence, to produce the desired pattern dimensions and location these nozzles should be mounted fixedly at an above-ground height of about 5.7 feet and angled from the vertical outwardly at about 23° and rearwardly at about 28°. The calculations based on manufacturer's data showed that the dimensions of the patterns and the distance from nozzles, of the outer and intermediate patterns would change, however, with changes in nozzle pressure. Hence, these nozzles should be mounted for adjustment of their above-ground height in order to maintain substantially constant the dimensions of their ground-impact spray patterns and distances thereof from the respective nozzles. As mentioned above, to produce the desired pattern and distance thereof from each nozzle, these outwardly throwing nozzles should be inclined downwardly at an angle from the horizontal, the outer at 5° and the intermediate at 23°.

An examination of FIGS. 1 and 2 shows that at a pressure of 30 psi and an above-ground height of 9.4 feet for the outside and intermediate nozzles, the swath width of the overall pattern will be about 60 feet with an output rate of 19 gallons per acre. With increasing pressures, to increase output rate, the above-ground height of the outside and intermediate nozzles should be lowered to maintain substantially constant swath width. Thus, for example, at a nozzle pressure of 80 psi for an output rate of 30 gallons per acre, the outside and intermediate nozzles should be at an above-ground height of 5 feet.

Liquid is supplied to the nozzles, from the usual vehicle-carried tank 20 by a centrifugal pump (not shown) driven in accordance with vehicle speed. If the applicator is a truck, the pump is usually driven by a power takeoff from the truck engine. If the applicator is a cart, i.e. a towed vehicle, the pump usually is driven by a ground-engaging wheel.

As explained in the aforementioned Pat. No. 4,267,971, it is most desirable to supply the nozzles with liquid from the tank 20 by a centrifugal pump of the type having an output pressure substantially proportional to the square of its speed (in RPM) because the output rate of an orifice, i.e. a nozzle, is substantially proportioned to the square root of the pressure of the liquid supplied thereto. In such a system, the application rate, at a given vehicle speed, is set by setting nozzle pressure, usually by a by-pass valve that returns a portion of pump delivery to a supply tank. Once so set, the centrifugal pump metering system will maintain application rate substantially constant at all other vehicle speeds, i.e., the output of or flow rate through a nozzle will be substantially linearly proportional to vehicle ground speed.

With the aforesaid example, a pressure setting of 50 psi at 10 mph, will enable an operator to drive as slow as 7.75 mph or as fast as 12.7 mph and have exactly the same application rate while maintaining nozzle pressure in the range of from 30 to 80 psi.

From an inspection of FIG. 2, it will be seen that the maximum throw of the outside nozzles is desirably somewhat greater than 30 feet, i.e. 32½ feet, because the ground-surface density of the spray at its minimum and maximum throws is less than that therebetween. Thus, adjacent passes of an applicator of a 60 foot swath width should overlap somewhat, e.g. 5 feet, to achieve uniform application. For the same reason, the nozzles are selected and arranged so that their separate patterns overlap somewhat, as shown in FIGS. 1 and 2. It also will be seen that the swath width of the individual patterns produced by the separate outside and intermediate nozzles varies somewhat with above-ground height and pressure changes. This is of little consequence, however, when applying, for example, liquid fertilizer, because plant roots grow out several feet to get their share of fertilizer. Further, rain and water in the soil tend to even out irregularities in surface density of the application.

For application rates in excess of 30 gallons per acre additional nozzles, for each type and size, can be added to provide for higher output rates. The reason for adding extra nozzles, instead of using larger size nozzles, is that nozzles of the same type and size will have patterns that vary slightly, and multiple nozzles of each type and size tend to minimize the effect on the pattern of any individual nozzle. Another reason is that if larger nozzles are used an operator will have to maintain a stock of many sets of different size nozzles, whereas with multiple nozzles he needs to stock only three sizes and types of nozzles.

Figure 4:
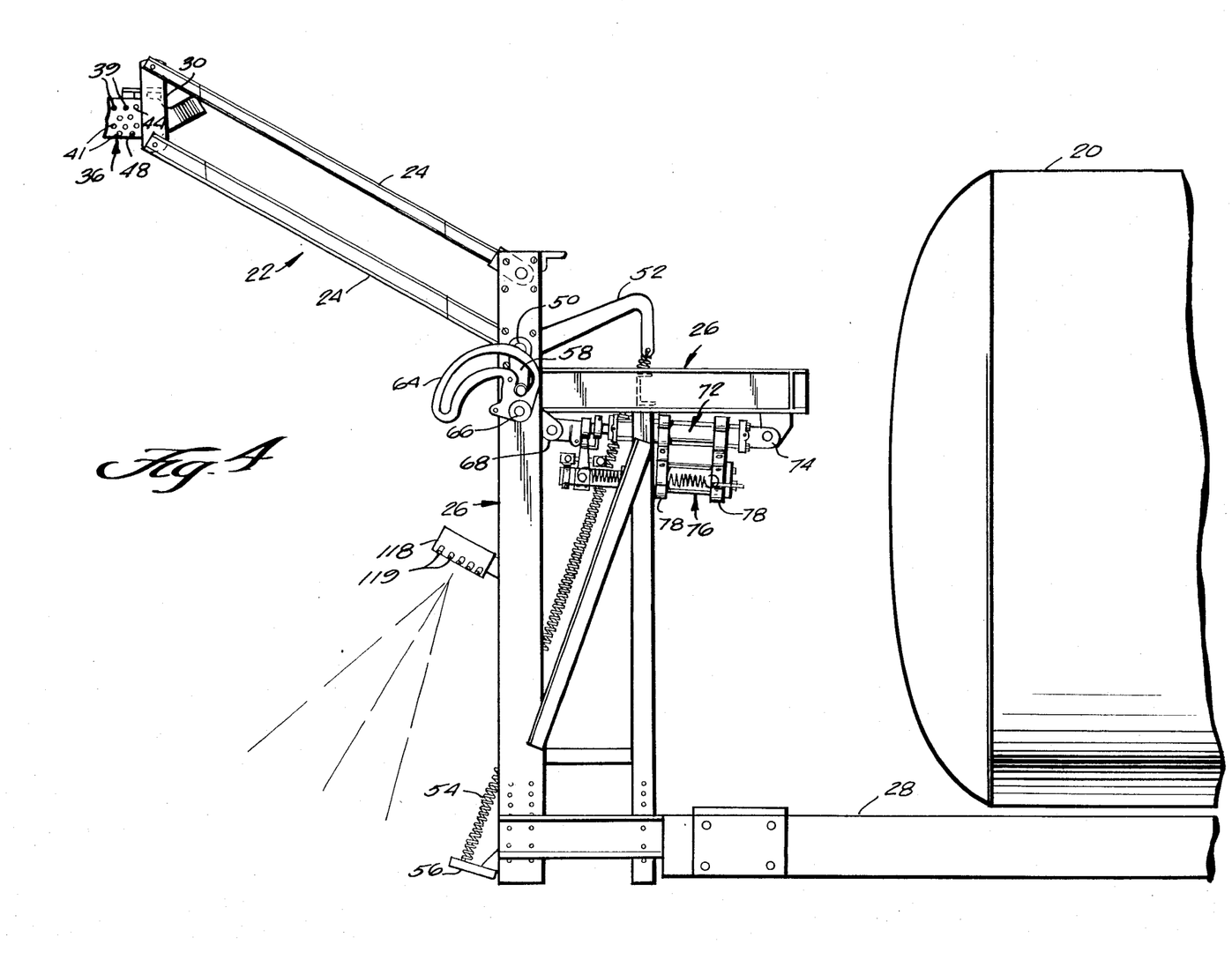
Figure 5:
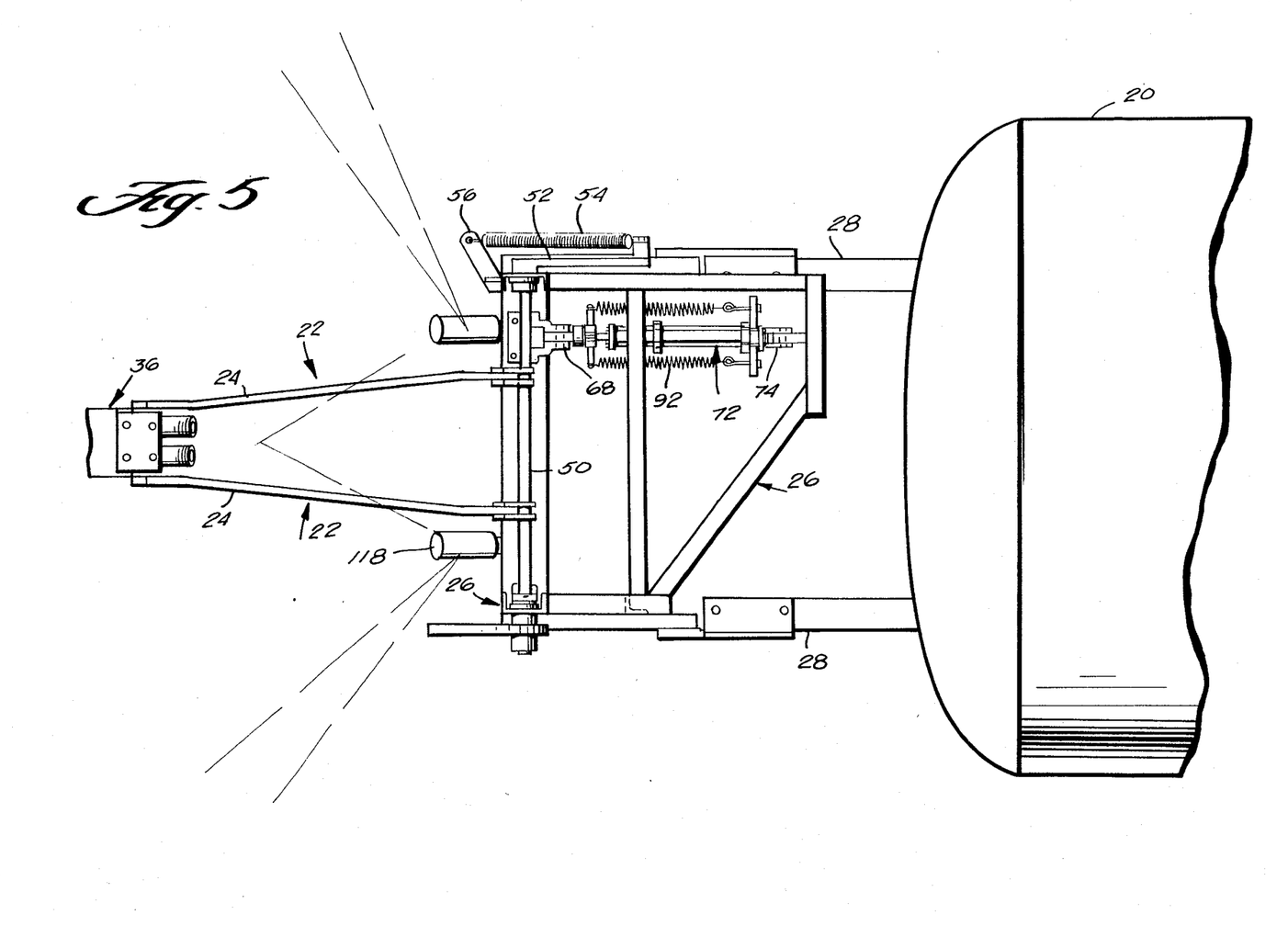
Figure 6:
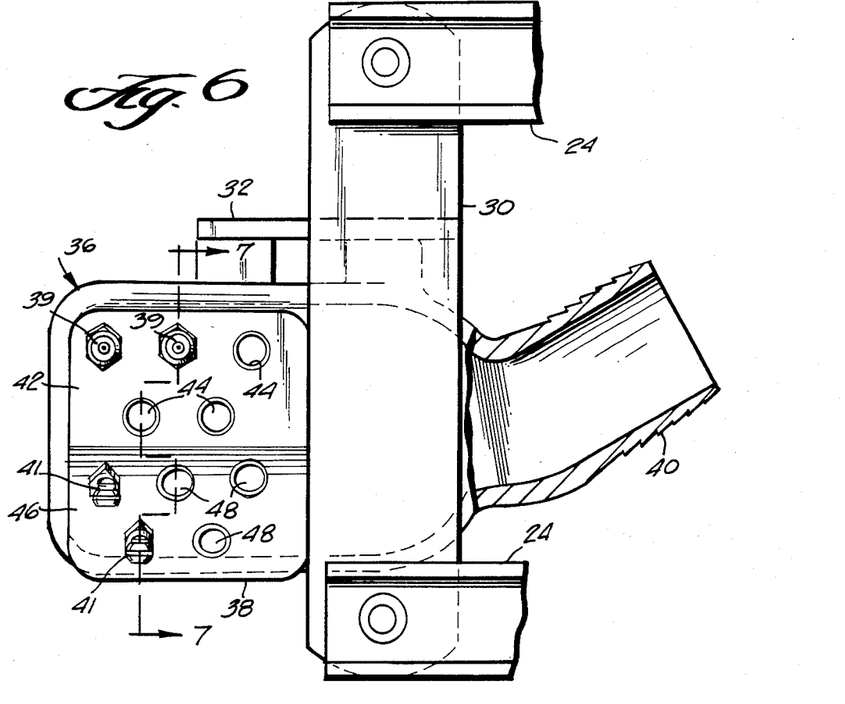
Figure 7:
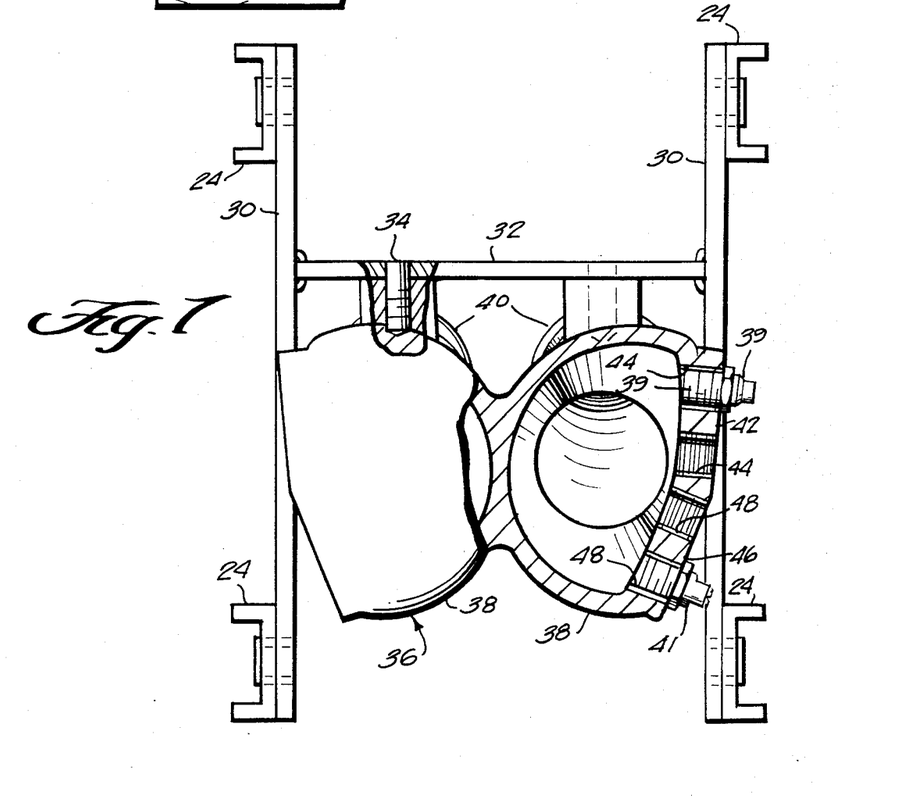
Figure 8:
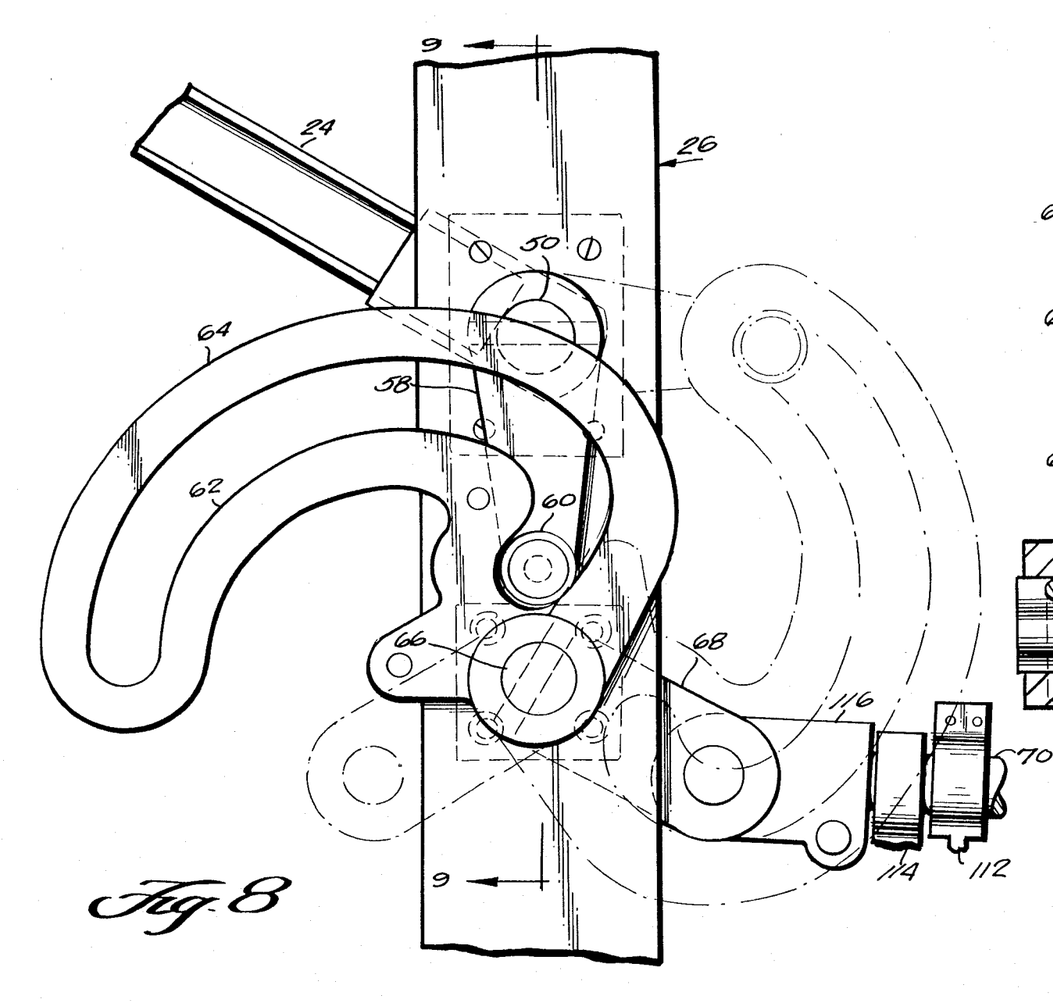
Figure 9:
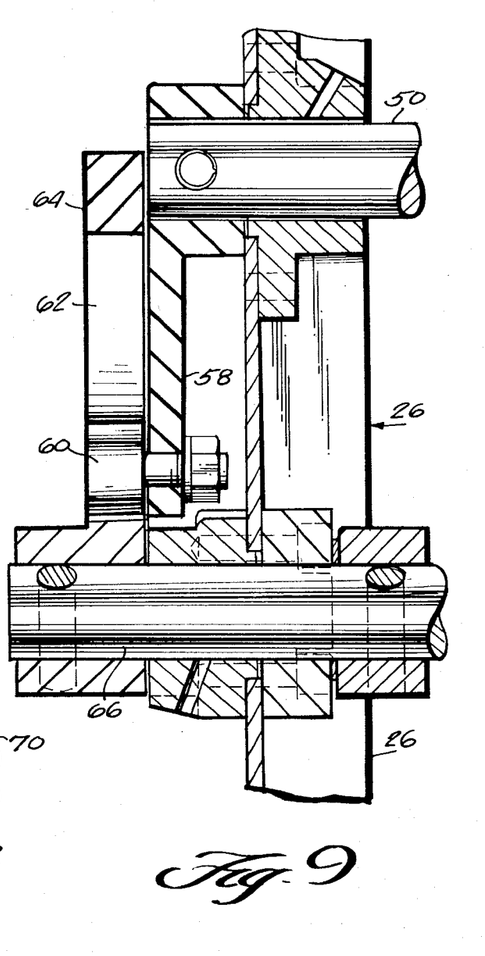

Referring now to FIGS. 4 to 17 of the drawings, there is shown a practical structural embodiment of this invention based on the foregoing example. Referring first to FIGS. 4 and 5, two laterally-spaced equal parallelogram linkages 22 each have two long parallel arms or links 24 pivotally mounted to and extending rearwardly of the upper end of an upstanding framework support 26 carried on the rear end of the frame 28 of a truck which also carries the usual tank 20 for the agricultural liquid to be applied. The rear arms 30 of the two linkages 22 carry between them, as by a cross-piece 32 welded thereto and screws 34, a nozzle head 36, best shown in FIGS. 6 and 7. The head 36 is divided into right and left sections, each having a separate manifold 38 provided with a supply neck 40 to which a liquid supply conduit (not shown) may be connected.

The laterally-facing side of each manifold 38 is tapped for detachable connection therewith of two sets of nozzles, a set, e.g. five, of outer nozzles 39 and a set, e.g. five, of intermediate nozzles 41. The manifold face 42, tapped, as at 44, for the outer nozzles 39, is flat and inclined at an angle of 5° to the vertical while the face 46, tapped, as at 48, for the intermediate nozzles 41, also is flat but inclined at an angle of 23°. The nozzles 39, 41 on each face 42, 46 are arranged in two horizontal rows and staggered vertically to avoid, as much as possible, interference between their sprays. An equal selected number of nozzles are attached to each face for a desired range of application rates between the aforesaid range of nozzle pressures of from 30 to 80 psi. Unused tapped apertures 44, 48 are closed by threaded plugs (not shown).

The inner ends of the lower long arms 24 are fixed to a shaft journalled in the support 26 and having a crank arm 52 fixed thereto. A coil tension spring 54 desirably is connected between the outer end of the arm and, as at 56, to the lower end of the support 26 to counterbalance the weight of the arms 24, 30 and head 36. Another crank arm 58 is fixed to the shaft 50 for moving the linkages 22 to adjust the above-ground height of the nozzle head 36 to correspond to pressure supplied to the nozzles carried by the head as follows:

| Above-Ground Height feet | Nozzle Pressure-psi |
|---|---|
| 9.4 | 30 |
| 7.8 | 40 |
| 6.6 | 50 |
| 5.9 | 60 |
| 5.4 | 70 |
| 5.0 | 80 |

To the outer end of the arm 58 there is secured a cam roller 60 fitted in the elongated slot 62 of a cam 64 fixed to a shaft 66 journalled in the support 26 parallel to the shaft 50. A crank arm 68 fixed to the shaft 66 has its outer end pivotally connected to the outer end of the piston rod 70 of an operating hydraulic cylinder 72 pivotally connected, as at 74, to the support 26. Thus, the cam 64 is rotated by the piston rod 70 to move the nozzle head 36 up or down while maintaining it in a fixed angular relationship to the carrying vehicle. The cam slot 62 is configured to move the nozzle head 36 to one of the above-listed above-ground heights in accordance with nozzle pressure.

Figures 10, 11:
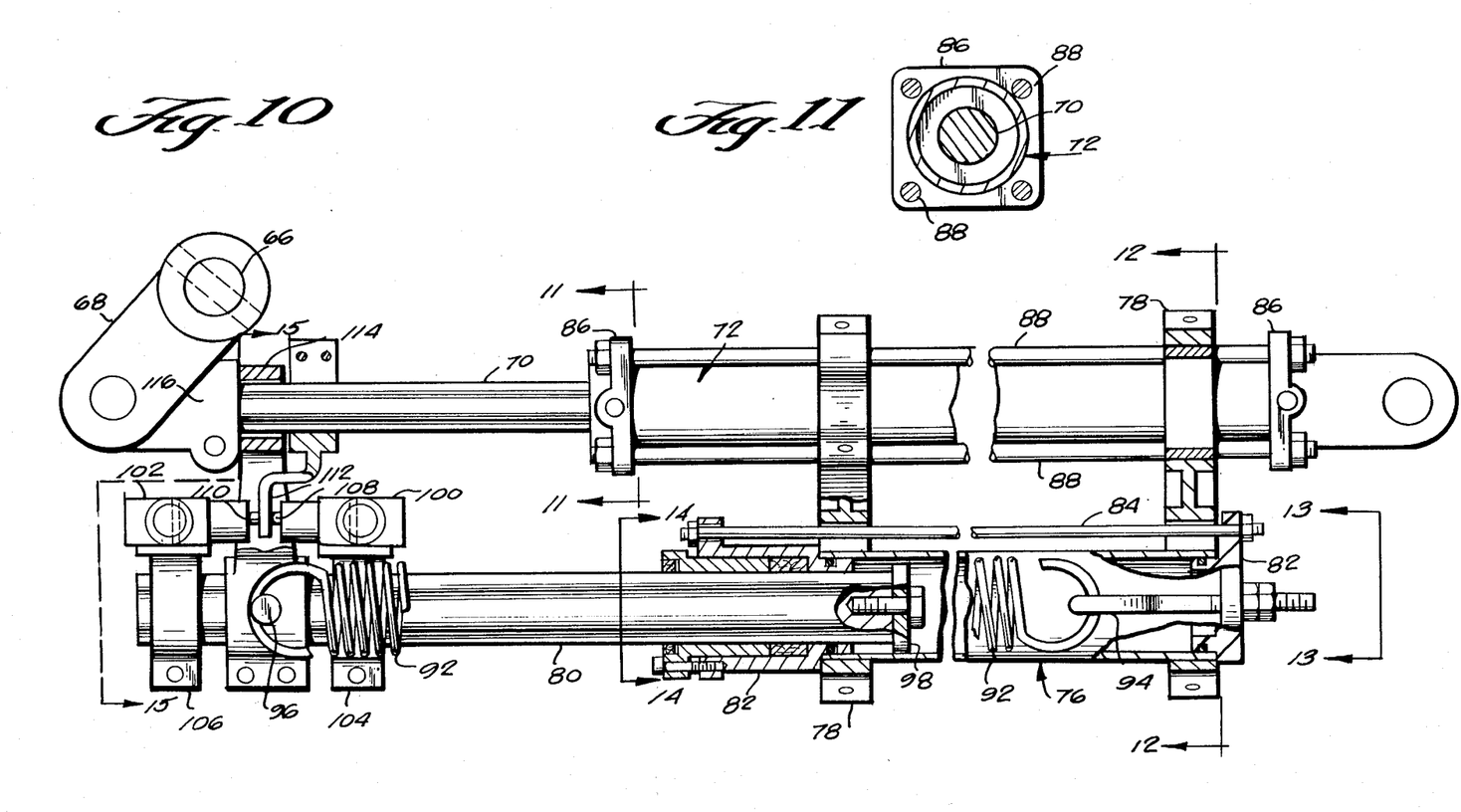
Figure 12:
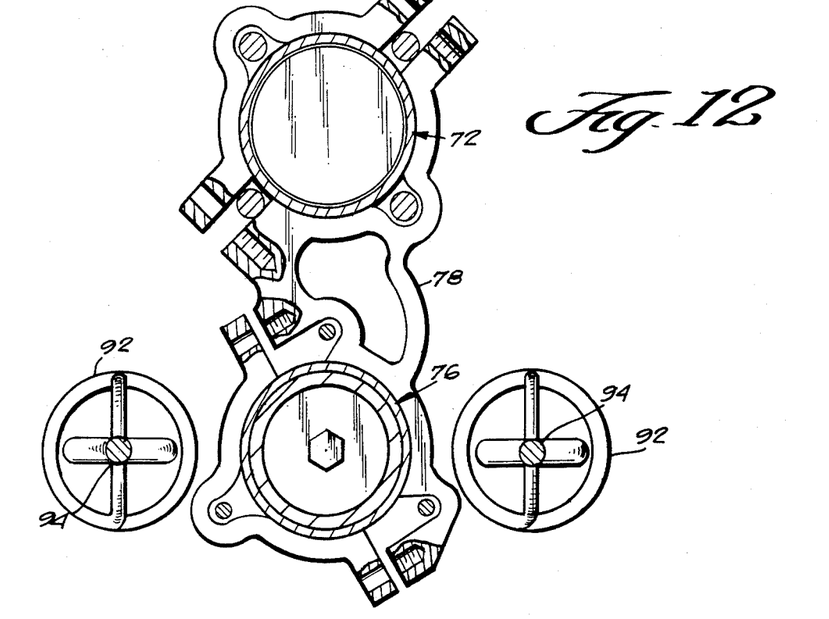
Figure 13:
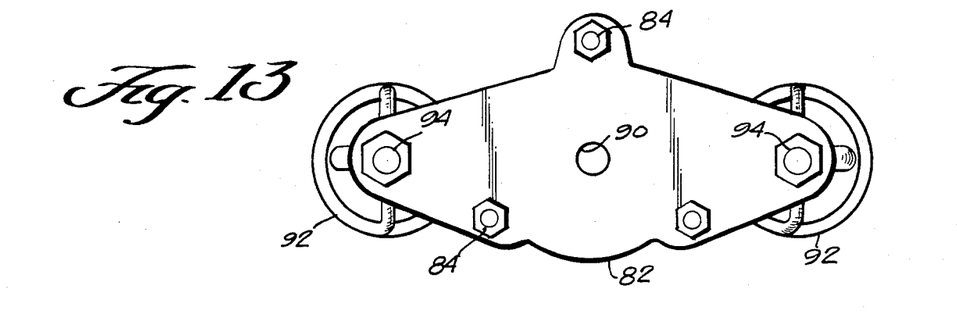
Figure 14:
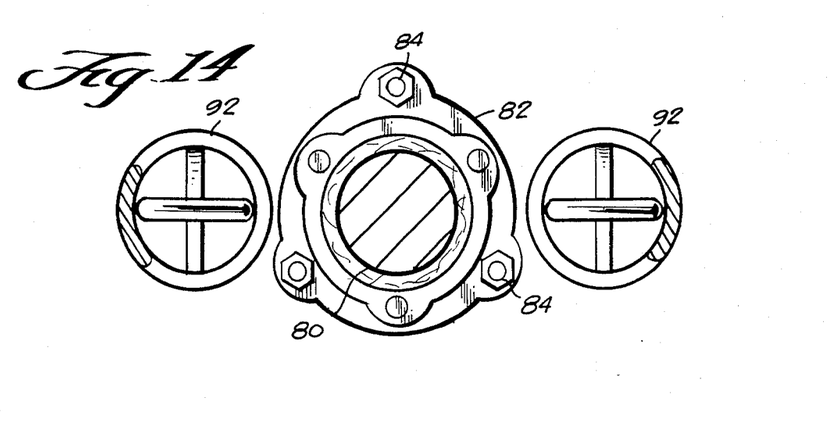

The operating cylinder 72, i.e., extent of extension of its piston rod 70, is controlled by a pressure sensing cylinder 76 shown in detail in FIG. 10. The pressure sensing cylinder 76 is secured to, and parallel with, the operating cylinder 72 by two clamp brackets 78 so that the piston rods 70, 80 of the two cylinders 72, 76 extend in the same direction. The opposite ends of the cylinder 76 are closed by end caps 82 retained in place by a set of three longitudinal bolts 84 extending therethrough. Similarly, the operating cylinder 72 has end caps 86 retained by a set of four bolts 88. Nozzle pressure may be admitted to the sensing cylinder 76 through an opening 90 in the rear end cap 82. The fluid admitted into cylinder 76 will not be the same as that supplied to the nozzles because the spray fluid usually is corrosive and abrasive. Hence, the nozzle fluid will be separated from the cylinder 76 actuating fluid by a diaphragm chamber (not shown), but the cylinder fluid will be at the same pressure as that supplied to the nozzles.

Extension of the piston rod 80 of the pressure sensing cylinder 76 is restrained by two coil tension springs 92 attached, by eye bolts 94, to the rear end cap 82 and to the opposite ends of a pin 96 extending transversely through the outer end of the piston rod 80. The springs 92 are accurately made and designed so that they will extend a predetermined distance, here 0.118", for each pound pressure exerted against the piston 98 of the cylinder 76, and when the piston rod 80 is fully retracted, the springs exert a force equivalent to that exerted on the piston 98 by 30 psi in the cylinder 76. Thus, if that pressure should rise to 40 psi, the rod 80 will extend 1.18", and to 80 psi will extend 5.9".

Two very accurate micro-switches 100, 102 are attached to the piston rod 80 on opposite sides of the pin 96 by clamp brackets 104, 106. Between the actuating buttons 108, 110 of the switches 104, 106 is an arm 112 clamped to the piston rod 70 of the operating cylinder 72. The switches 100, 102 operate a 4-way battery-operated solenoid valve (not shown). When the rod 80 extends, the button 108 of the switch 100 will press against the arm 112 and close the switch 100. Such closing will operate the valve, through conventional circuitry, to admit hydraulic fluid under pressure, from a small engine-driven hydraulic pump (not shown), to the actuating cylinder 72 on one side of the piston (not shown) therein and to exhaust fluid from the cylinder 72 on the other side of the piston to extend the piston rod 70 until pressure on the button 108 is relieved to open the switch 100 and close the valve. The other switch 102 operates in the same manner to operate the valve to admit hydraulic fluid under pressure to the cylinder 72 on the other side of the piston therein and to exhaust hydraulic fluid from the one side of the piston to retract the piston rod 70 so as to adjust the extent of extension of the piston rod 70 of the actuating cylinder 72 to correspond exactly with that of the pressure sensing cylinder 76. The two switches 100, 102 operate the 
solenoid valve to open and close so rapidly (35 milliseconds) that the piston rod 70 stops as soon as its movement opens one switch without overriding and closing the other switch.

An arm 114 clamped to the rod 80 between the switch brackets 104, 106 fits loosely about the rod 70 between the piston clamped end of the arm 112 and the fitting 116 on the end of the rod 70. The arm 114 prevents rotation of the piston rod 80 but has sufficient play between the fitting 116 and the arm 112 to allow the switches 100, 102 to operate unrestrained. Should one of the switches 100, 102 fail for any reason to make or break a circuit, however, the arm 112 has adequate strength to prevent one rod 70, 80 from moving ahead of the other sufficiently to damage a switch.

The pressure sensing cylinder 76 is not attached directly to the crank arm 68 to rotate the shaft 66 because in rough ground the linkage arms 24 and nozzle head 36 could exert a high torque on the shaft 50 even though the weight of the arms and head is counterbalanced by the spring 54. Such a torque would exert considerable force on the cam roller 60 which would make the displacement of the piston rod 80 of the pressure sensing cylinder 76 inaccurate.

Figures 15, 16:
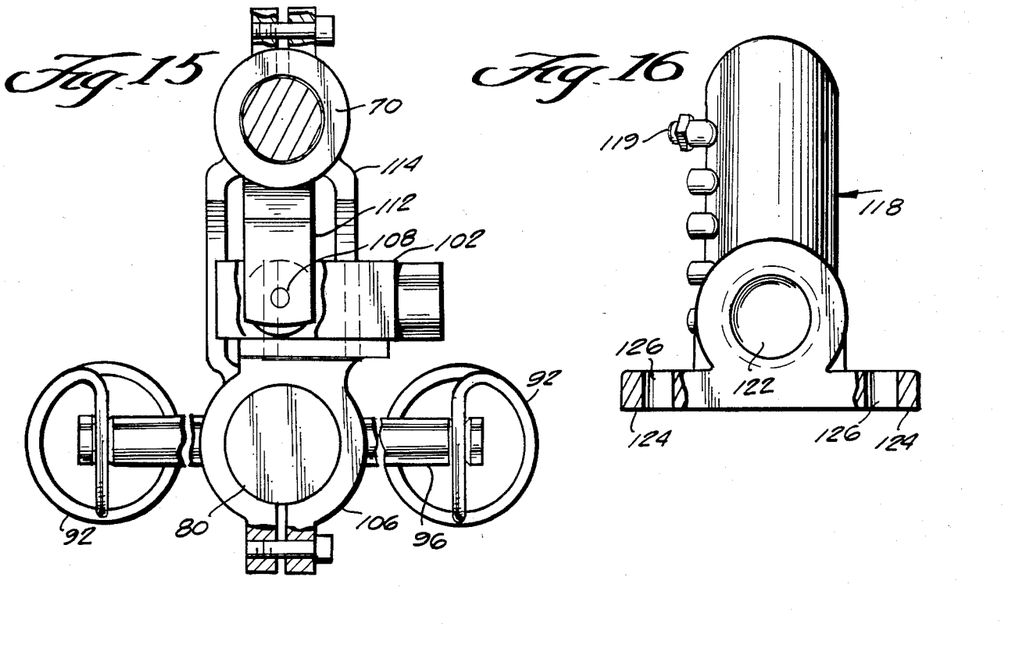
Figure 17:
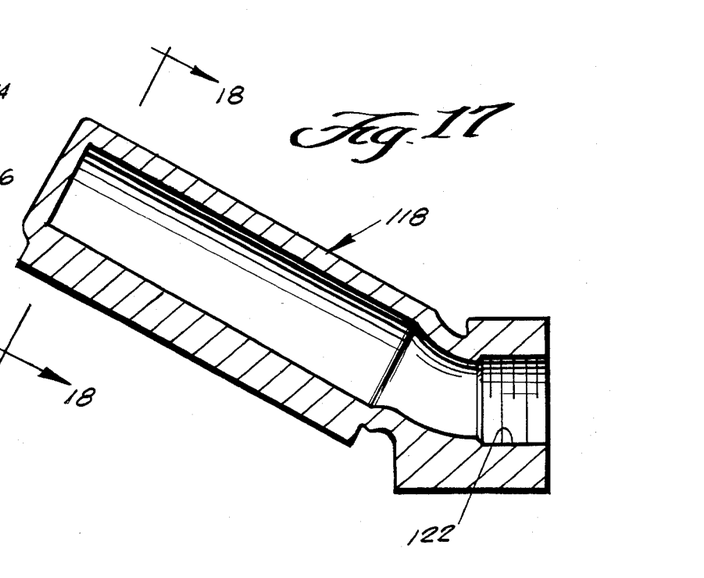
Figure 18:
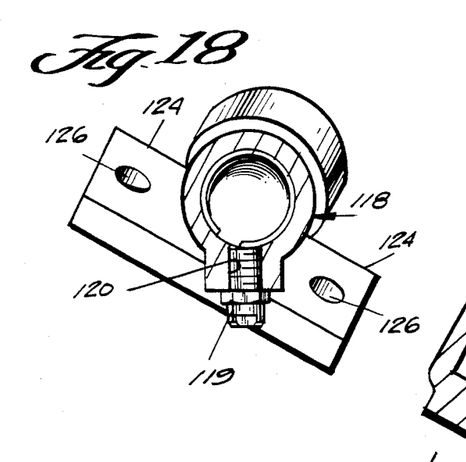
Figures 19, 20, 21, 22, 23:
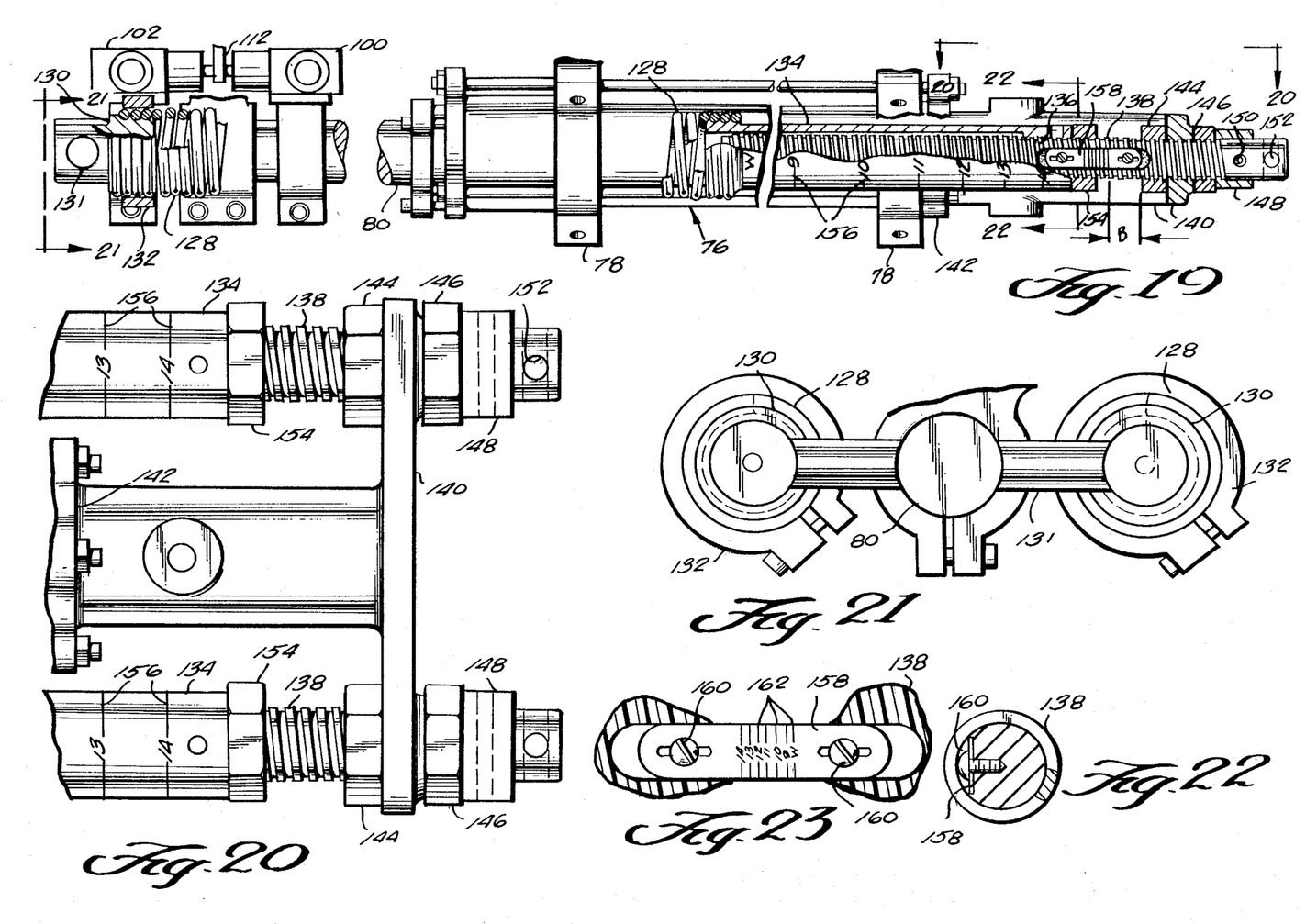

Referring now to FIGS. 16–18 of the drawings, there is shown a tubular manifold 118 for the right center nozzles. The manifold 118 has a row of tapped openings 120 therealong to receive a set, e.g. five, of center fan nozzles 119 directed at an angle of about 23° to the right of the vertical and about 28° to the rear of the vertical. Plugs (not shown) cover unused openings 120. An inlet opening 122 for the connection of a supply conduit (not shown) for spray liquid is provided at one end of the manifold 118, which also is provided with bracket-like flanges 124 having screw-receiving openings 126 for securing the manifold to the support 26.

The supply conduits (not shown) for the several manifolds 38, 118 are controlled by suitable valves (not shown) so that the spray can be directed selectively to both the right and the left manifolds or to either in case an operator almost finishes application to a field and has only about one-half of a swath, e.g. 30 feet width, to finish completely.

The aforementioned angles of the several nozzles are the result of calculations based on manufacturing data. Extensive tests may indicate that some small changes should be made in such angles.

As stated above, the aforedescribed example is based on nozzle manufacturer's data for spraying water at 70° F. Water weighs 8.34 lbs. per gallon and has a specific gravity (S) of 1. If the liquid sprayed has a specific gravity higher than 1, the several nozzles 39, 41 will not flow at the same rate and provide the same nozzle velocity as water unless nozzle pressure is increased in proportion to the specific gravity. Most agricultural liquids have specific gravities higher than 1. Hence, to maintain the same ground-impact pattern set forth in the foregoing example for agricultural liquids, instead of water, nozzle pressure must be increased.

For example, an agricultural liquid weighing 12.51 lbs. per gallon would have a specific gravity of $$1.5\,\frac{(12.51)}{(8.34)}\,.$$

Hence, to maintain the same nozzle flow rate and ground-impact pattern of the foregoing example when using a liquid having a specific gravity of 1.5, the nozzle pressures of 30 and 80 psi will have to be increased to 45 and 120 psi, respectively.

The position, or extension, of the piston rod 80 of the pressure-sensing cylinder 76 at 45 and 120 psi, however, for a liquid of 1.5 S will have to be the same as at 30 and 80 psi for water, in order to maintain the same flow rate and nozzle velocity as with water, and correspondingly the same ground-impact pattern and distance from the nozzle because pattern and distance are dependent on nozzle height which, in turn, is controlled by the position of the piston rod of the pressure-sensing cylinder. Fortunately, a centrifugal pump of the aforedescribed type develops a discharge pressure proportional to the specific gravity of the pumped liquid at the same operating speed and flow rate. Hence, such a pump that develops 30 psi with water, under certain conditions will develop 45 psi when the pumped liquid has a specific gravity of 1.5.

In the foregoing example, to control ground-impact patterns at pressures of 30–80 psi, the area of the piston 98 of the pressure-sensing cylinder 76 should be 1.767 sq. in. For that area the two tension springs 92 have to have a combined spring constant of 14.97 lbs/in., so that the piston rod 80 will extend 5.9" with a change in load from 53.01 lbs. (30×1.767) to 141.36 lbs (80×1.767). The constant equals the load change divided by the extension distance, i.e., (141.36−53.01)÷5.9, or 14.97×S.

In view of the foregoing this invention also provides means for adjusting the springs to compensate for spraying liquids of different specific gravities, especially specific gravities higher than 1. Referring now to FIGS. 19–23 of the drawings there is shown means for adjusting the spring constant, and initial spring tension, to maintain the same nozzle height for a given nozzle velocity and flow rate for liquids having weights of from 8.34 (water) to 14 lbs/gallon and specific gravities of from 1 to 1.679. In this arrangement the rod end of each spring 128 is held by an externally-threaded plug 130 threaded into the spring and transfixed by a transverse pin 131 extending through the rod 80. This rod end of the spring 128 is fixed to the plug 130 against unscrewing movement by an exterior clamp 132. The other or cylinder end of the spring 128 is held by an adjustable externally-threaded hollow plug 134, threaded into the spring and having interior threads 136 engaged with one end of a tension-adjusting screw 138. The other end of the screw 138 extends freely through a cross piece 140 on the cylinder end cap 142 and is lockable thereto by lock nuts 144, 146. The pitch of the spring 128 and of the screw 138 are desirably the same. The outer end of the screw 138 has a stop collar 148 secured thereto, as by a roll pin 150, and beyond the collar has a tool or wrench-engageable configuration, e.g. a transverse opening 152. Spaced from the nut 144 is another lock nut 154 engageable against the end of the plug 134 for a purpose later described.

Thus, plug 134 may be screwed into the spring 128 to adjust the number of active coils of the spring, and thus the spring constant K. The spring constant K is equal to $$\frac{P}{f \times N}$$

where:

P=Rated load capacity of spring f=Deflection of one coil under load P

N=Number of active coils.

Thus, the number of coils N required for a given constant K is $$\frac{P}{f \times K}.$$

The number of coils required to give the correct spring constant K for each specific gravity desired is thus easily calculated. The adjustable plug 134 is then provided with specific gravity indicia 156, preferably expressed in pounds per gallon, alignable with the cylinder end of the spring 128 to indicate when the plug 134 has been screwed sufficiently into the spring to provide the number of active coils required for the constant K needed for the specific gravity of the liquid to be sprayed. To so adjust the plug 134 the lock nuts 144, 154 first are loosened and the screw 138 screwed into the plug 134 until the nut 146 engages the crosspiece 140 and the collar 148 is engaged with the nut 146. The plug 134 is then screwed into the spring 128 to align with the end thereof the desired specific gravity idica 156. The locknut 154 is then tightened against the plug 134 to lock it to the screw 138.

Once both springs 128 are so adjusted for the correct constant K, they must be further adjusted for the correct initial tension. The required initial tension equals the cross-sectional inner area of the cylinder 76 times 30 psi times S. Thus, the initial tension for a liquid having a specific gravity of 1.5 is 1.5×30×1.767=79.52 lbs. Since the constant K for the spring 128 is known, and having specified its wound initial tension, Ti, for the manufacture of the spring, the amount that the spring must be tightened, i.e., stretched or extended, for a given initial tension is (79.52−Ti)÷K, for a liquid with a specific gravity of 1.5.

With the foregoing it is an easy matter to provide the screw 138 with a scale 158 adjustably mounted by screws 160 and graduated with indicia 162, like the plug 134, in terms of lbs/gallon for use in stretching the spring 128 the necessary distance "B" to provide the correct initial tension. Thus, to adjust the spring 128 for the correct initial tension the lock nut 144 is turned, without turning the screw 138, until its left edge is aligned with the specific gravity indicia 156 (in lbs/gallon) on the scale plate 158 which corresponds to the setting of the spring screw plug 134. The lock nut 146 is then turned, to tighten or extend the spring 128, while restraining turning of the screw 138, as by an appropriate tool (not shown) inserted in the transverse opening 152 in the end of the screw, until the lock nut 144 engages the cross piece 140. This applies the correct initial tension to the spring 128 and locks the settings. This operation is repeated for the other spring 128. The foregoing arrangement is based on one wherein the pitch of the spring 128 and the screw 138 are the same. If not, corrections must be made.

Flow rate of a nozzle also is affected by viscosity of the liquid as well as by specific gravity. While the spring screw plug 134 and adjusting screw 138 do not provide for compensation for different viscosities, they do enable a field operator to make adjustments for viscosity, as may be required, by visual examination of the spray-impact pattern for a given height of the laterally throwing outside and intermediate nozzles 39, 41.

For example, if a field operator has set the spring screw plug 134 and initial spring tension for a given nozzle height and observes that the resulting throw of the outer and intermediate nozzles 39, 41 is too short for a liquid weighing 10 lbs/gallon, he may change the setting to 10.5 or 11.0 lbs/gallon or to whatever setting provides the proper throw at the given nozzle height. Once the setting is made to obtain the correct throw at the given height, the throw will be correct for all heights.

Figure 1A:
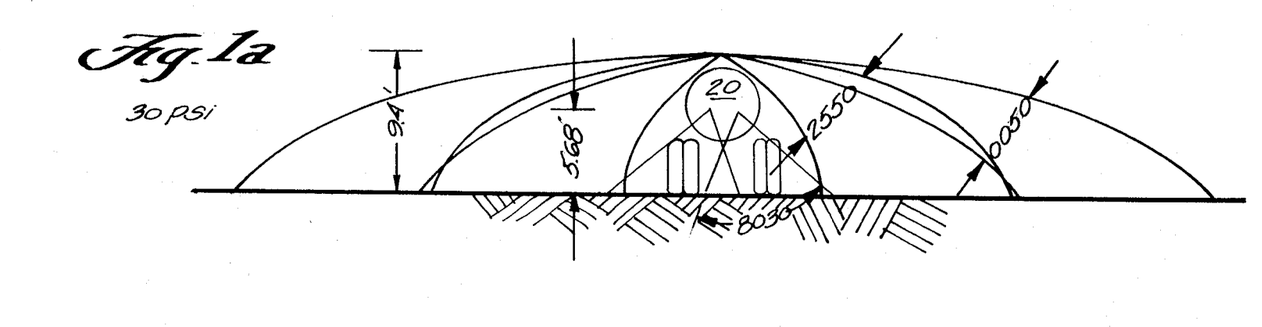
Figure 1B:
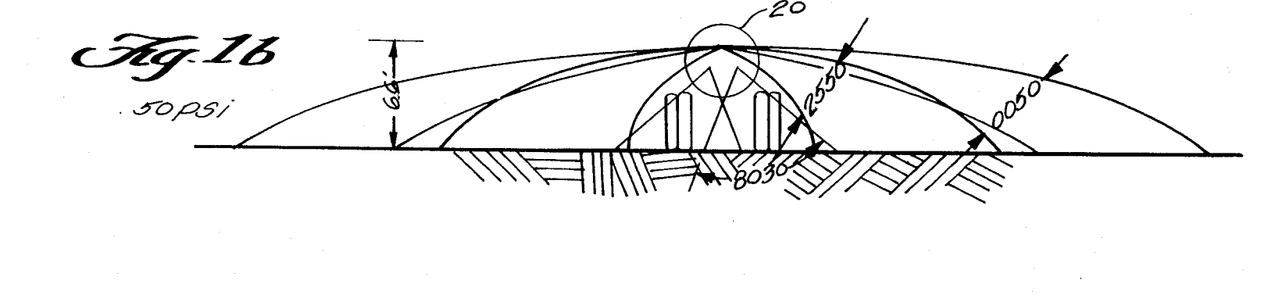
Figure 1C:
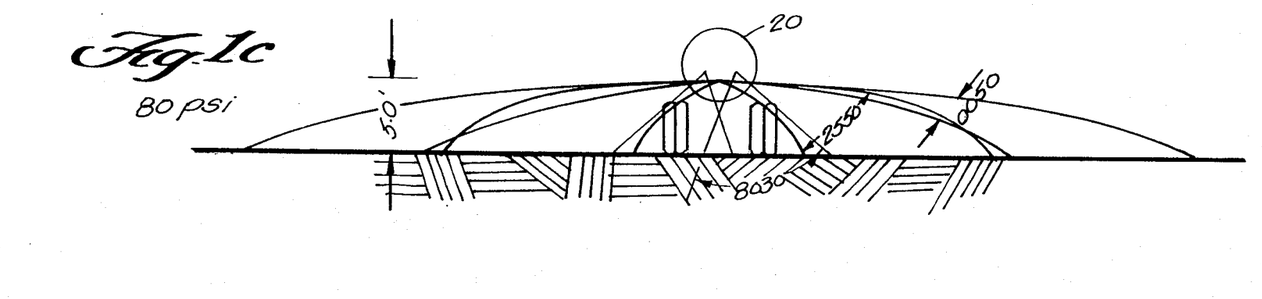
Figures 2, 3A, 3B, 3C:
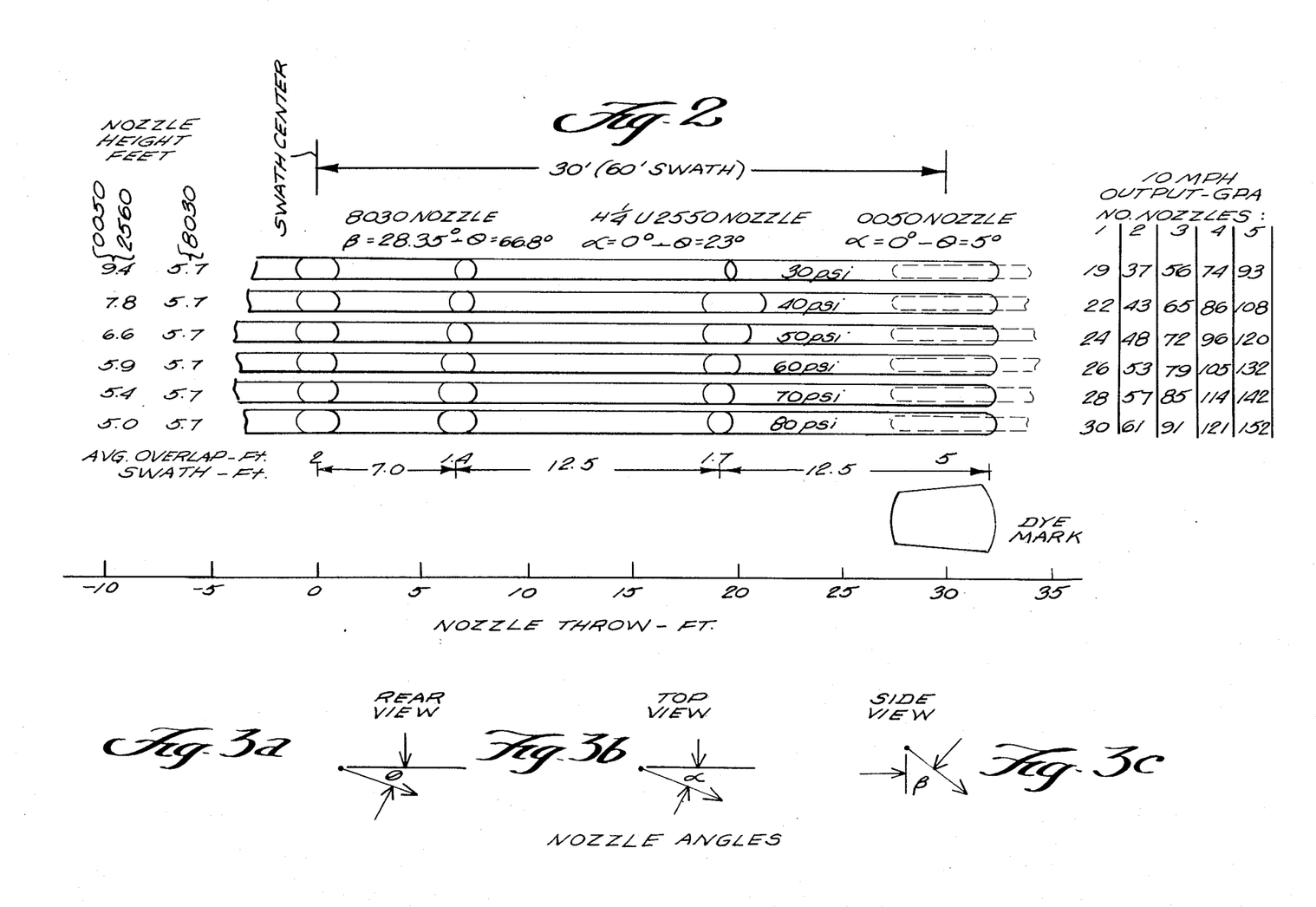

For accurate passes of an applicator embodying this invention, the sprayer also will be provided with a fixed nozzle (not shown) to eject periodic pulses of extremely short duration of a dye-containing liquid. The nozzle will be directed and supplied with the liquid by a valve to provide timed pulses that will create a spot ground-impact pattern of the dye at one extreme free edge of the swath, as shown in FIG. 2, at predetermined intervals, e.g. every 100 feet, along the line of travel. By "free" edge is meant the swath edge not adjacent a preceeding pass. Such dye marks will enable an operator to steer properly to coincide accurately adjacent passes.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

I claim:

1. Boomless apparatus for applying agricultural liquids to the ground at a predetermined rate, in amount per unit area, with vehicle means traveling over the ground at a controlled rate of speed and carrying a supply of the liquid, comprising:

nozzle means for emitting a spray of the liquid;

means for supplying liquid under pressure from the supply to said nozzle means at an adjustable rate, in amount per unit time, proportional to vehicle speed;

means mounting said nozzle means on the vehicle means within the confines of the lateral outlines of the vehicle means and for directing the spray generally laterally outwardly of the direction of movement of the vehicle means so that the spray will impact the ground in a pattern generally in the shape of a narrow band moving transversely of its length, which length is the swath width of the pattern;

said nozzle means being constructed so that the swath width of said pattern and the distance thereof from said nozzle means varies with (a) the pressure of the liquid supplied to said nozzle means over a predetermined range of said pressures and (b) the above-ground height of said nozzle means; and said mounting means including means for adjusting the above-ground height of said nozzle means for correspondence with the pressure of the liquid supplied thereto in order to maintain substantially constant the swath width of said pattern and the lateral distance thereof from said nozzle means.

2. The structure defined in claim 1 in which the height adjusting means is automatic in response to the liquid pressure.

3. The structure defined in claim 2 in which the height adjustment means includes adjustable means for compensating for liquids of different specific gravities.

4. The structure defined in claim 3 which the adjustable compensating means adjusts the liquid pressure required to attain given above-ground heights.

5. The structure defined in claim 2 in which the height-adjusting means includes:
a hydraulic linear actuator operable by liquid under pressure independent of the liquid supplying means; and
means for controlling the position of the movable part of said actuator in accordance with the pressure of the liquid supplied to the nozzle means.

6. The structure defined in claim 5 in which the controlling means includes adjustable means for compensating for liquids of different specific gravities.

7. The structure defined in claim 5 in which the control means includes:
a pair of switches for controlling electrically-operable valve means for supplying and exhausting liquid under pressure to and from the actuator, said switches having opposed operating push-buttons;
means carried by the movable part of said actuator extending between said buttons; and
means mounting said switches for linear movement parallel to that of said movable part and responsive to the pressure of the liquid supplied to the nozzles so that the extent of said movement corresponds to said pressure.

8. The structure defined in claim 1 in which the supplying means includes centrifugal pump means driven in accordance with the speed of the vehicle means.

9. The structure defined in claim 1 in which the nozzle means is inclined downwardly from the horizontal.

10. The structure defined in claim 1 in which there are two like nozzle means for emitting sprays in opposite lateral directions.

11. The structure defined in claim 1 including a manifold for mounting a plurality of like nozzle means to selectively vary the application rate by mounting a predetermined number of nozzle means to said manifold.

12. The structure defined in claim 1 in which the height adjusting means includes a parallelogram linkage for maintaining substantially constant the direction of the spray emitted by the nozzle means.

13. The structure defined in claim 1 in which there are at least two nozzle means on the mounting means for emitting sprays in the same lateral direction having ground-impacting patterns which somewhat overlap laterally.

14. The structure defined in claim 13 in which the two nozzle means are inclined downwardly from the horizontal at different angles.

15. The structure defined in claim 1 including:
additional nozzle means supplied by the supplying means for emitting a fan-shaped spray of the liquid;
means fixedly mounting said additional nozzle means on the vehicle means for directing the spray generally downwardly with the plane of the spray extending transversely of the direction of movement whereby the ground-impacting pattern of the spray is generally in the shape of a narrow band moving transversely its length, which length is the swath width of the pattern, the pattern being located laterally inwardly of but somewhat overlapping laterally the pattern of the spray emitted by the height-adjustable nozzle means; and
said additional nozzle means being constructed so that the swath width of said ground-impacting pattern of the spray emitted thereby is substantially constant over the predetermined range of pressures.

16. The structure defined in claim 15 in which there are two height-adjustable nozzle means for emitting sprays in opposite lateral directions and two fixedly mounted nozzle means with the ground-impacting pattern of all adjacent sprays emitted from said nozzle means somewhat overlapping laterally.

17. The structure defined in claim 15 in which the additional nozzle means is inclined rearwardly of the direction of movement at an acute angle from the vertical.

18. The structure defined in claim 15 in which the additional nozzle means is inclined laterally outwardly at an acute angle from the vertical.

19. A boomless method of applying agricultural liquids to the ground at a predetermined rate, in amount per unit area, the steps comprising:
supplying nozzle means with the liquid under pressure at an adjustable rate, in amount per unit time, to generate a spray;
moving the nozzle means horizontally over the ground with moving vehicle means while confining the nozzle means within the lateral outlines of the vehicle means and directing the nozzle means to emit the spray generally laterally of the direction of the movement of the nozzle means so that the spray will impact the ground in a pattern generally in the shape of a narrow band moving transversely of its length, which length is the swath width of the pattern; the rate of the liquid supply being proportional to the speed of the movement;
the nozzle means being constructed so that the swath width of said pattern and the distance thereof from the nozzle means varies in accordance with (a) the pressure of the liquid supplied to the nozzle means over a predetermined range of such pressures and (b) the above-ground height of the nozzle means; and
adjusting the above-ground height of the nozzle means for correspondence with the pressure of the liquid supplied thereto in order to maintain substantially constant the swath width of said pattern and the distance thereof from the nozzle means.

20. The method defined in claim 19 including:
supplying the nozzle means with liquid from centrifugal pump means; and
driving the pump means at a speed proportional to the speed of the horizontal movement of the nozzle means.

21. The method defined in claim 19 in which the height adjusting step is automatic in response to the liquid pressure.

22. The method defined in claim 21 including the additional step of adjusting the liquid pressure supplied to the nozzle means to that required to attain given above-ground heights for compensating for liquids of different specific gravities.

23. The method defined in claim 19 in which the nozzle means is directed at an inclination downwardly from the horizontal.

24. The method defined in claim 19 in which there are two like nozzle means with a common supply to emit sprays in opposite lateral directions.

25. The method defined in claim 19 in which there are at least two nozzle means with a common supply directed to emit sprays in the same lateral direction with 
ground-impacting patterns that somewhat overlap laterally.

26. The method defined in claim 25 in which the two nozzle means are directed at different inclinations downwardly from the horizontal.

27. The method defined in claim 19 including:
additional nozzle means to generate a fan-shaped spray with the same supply and horizontal movement as the laterally directed nozzle means;

directing the additional nozzle means to emit the spray generally downwardly with the plane of the spray extending transversely of the direction of movement whereby the ground-impacting pattern of the spray is generally in the shape of a narrow band moving transversely of its length, which length is the swath width of the pattern, the pattern being located laterally inwardly of but somewhat overlapping laterally the pattern of the spray emitted by the laterally directed nozzle means;

maintaining substantially constant the above-ground height of the additional nozzle means; and the additional nozzle means being constructed so that the swath width of the ground-impacting pattern of the spray emitted thereby is substantially constant over the predetermined range of pressures.

* * * * *